(12) United States Patent
Muramatsu et al.

(10) Patent No.: US 6,741,548 B2
(45) Date of Patent: May 25, 2004

(54) OPTICAL DISC, AND METHOD OF AND APPARATUS FOR RECORDING SIGNAL ONTO THE SAME

(75) Inventors: Eiji Muramatsu, Tokorozawa (JP); Shoji Taniguchi, Tokorozawa (JP); Masahiro Kato, Tokorozawa (JP); Kazuo Kuroda, Tokorozawa (JP); Masami Oishi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/409,103

(22) Filed: Apr. 9, 2003

(65) Prior Publication Data

US 2003/0223342 A1 Dec. 4, 2003

Related U.S. Application Data

(63) Continuation of application No. 09/784,124, filed on Feb. 16, 2001, now Pat. No. 6,594,224.

(30) Foreign Application Priority Data

Feb. 16, 2000 (JP) ........................................ P2000-38609
Mar. 21, 2000 (JP) ........................................ P2000-78102

(51) Int. Cl.⁷ ................................................ G11B 7/00
(52) U.S. Cl. ................................ 369/275.4; 369/275.1; 369/44.26; 369/47.1
(58) Field of Search .............................. 369/47.1, 47.21, 369/47.22, 47.28, 53.1, 53.2, 53.31, 53.34, 53.44, 59.1, 59.25, 275.1, 275.4

(56) References Cited

U.S. PATENT DOCUMENTS

| | | | | |
|---|---|---|---|---|
| 5,406,536 A | * | 4/1995 | Doi .......................... | 369/44.28 |
| 5,946,287 A | | 8/1999 | Nakayama et al. | |
| 6,229,784 B1 | | 5/2001 | Yoshimoto et al. | |
| 6,301,208 B1 | | 10/2001 | Sugaya et al. | |

* cited by examiner

Primary Examiner—Muhammad Edun
(74) Attorney, Agent, or Firm—Sughrue Mion, PLLC

(57) ABSTRACT

An optical disc (1) is provided with: a disc substrate (110); an information track (102, G) formed on the disc substrate spirally or coaxially around a center of the disc substrate, on which an information signal including a physical sector number is to be recorded; and a guide track (102, L) adjacent to the information track and formed on the disc substrate spirally or coaxially around the center, on which a guide signal including address information is to be recorded, wherein a readable emboss area, in which the information signal is recorded by an emboss pit, and an unreadable emboss area, in which an unreadable emboss pit to disable writing and reading the information signal, are formed on the information track, and the guide signal is not recorded on the guide track corresponding to the readable emboss area and the guide signal is recorded on the guide track corresponding to the unreadable emboss area.

15 Claims, 14 Drawing Sheets

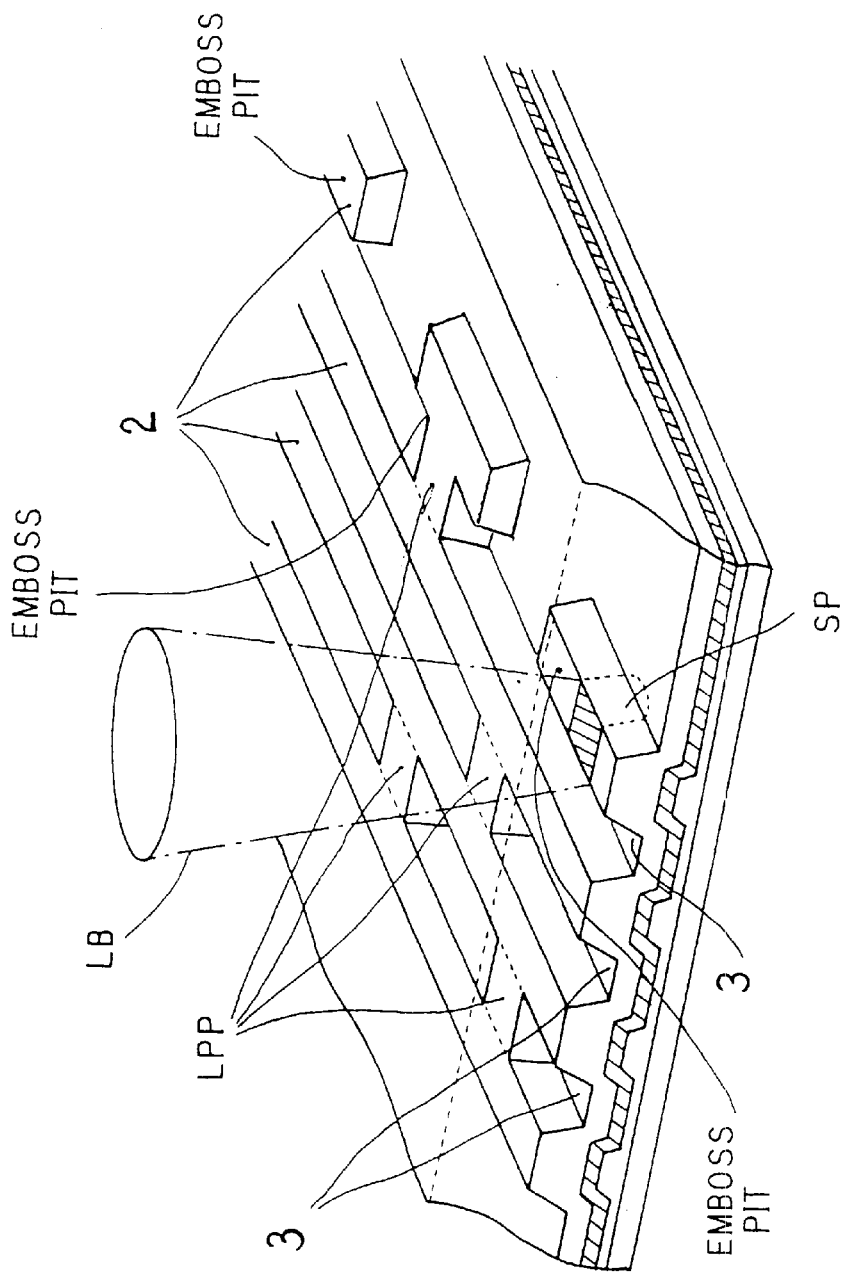

OPTICAL DISC, AND METHOD OF AND APPARATUS FOR RECORDING SIGNAL ONTO THE SAME

This is a continuation of application Ser. No. 09/784,124 filed Feb. 16, 2001 U.S. Pat. No. 6,594,224; the disclosure of which is incorporated herein by reference.

BACKGROUND OF THE INVENTION

1. Field of the Invention

The present invention relates to an optical disc and a method of and an apparatus for recording a signal onto the optical disc, which is especially suitable for a DVD-RW (DVD Re-recordable).

2. Description of the Related Art

There are various types of optical discs because of the diversification of formats of the CDs (Compact Discs) and the introduction of the DVD.

According to the formats of the CDs, there are a read only type CD-ROM (CD-Read Only) on which data can be read many times but cannot be written, a write once type CD-R (CD-Recordable) on which data can be read many times and can be written only once, and a CD-RW (CD Rewritable) on which data can be read many times and can be written many times. According to the formats of the DVDs, there are a read only type DVD-ROM (DVD Read Only) on which data can be read many times but cannot be written, a write once type DVD-R (DVD-Recordable) on which data can be read many times and can be written only once, a re-recordable type DVD-RW (DVD Re-recordable) on which data can be read many times and can be written for limited times, and a rewritable type DVD-RAM (DVD Rewritable) on which data can be read many times and can be written many times.

FIG. 13 shows an example of a data structure and allocations of addresses in a lead in area in the format of the DVD-RW.

In FIG. 13, an initial zone having 3078 ECC blocks is allocated from an ECC block address of "0022FA"h, which is a start position of the lead in area belonging to a readable emboss data zone, where data cannot be rewritten. In this initial zone, all "00"h data are set which imply a blank. A reference code zone having 2 ECC blocks is allocated from the ECC block address "002F00"h following this emboss data zone. In this reference code zone, an emboss reference code is recorded. More concretely, a code within a conversion table set in advance as the emboss reference code is repeated. The apparatus is set such that this predetermined code word can be correctly read out, in other words, the code word can be read out within a predetermined error rate range. Following to this reference code zone, a first buffer zone having 30 ECC blocks is allocated in which all data "00"h are set which imply a blank again from the ECC block address "002F02"h.

A control data zone having 192 ECC blocks is allocated which starts from the next ECC block address "002F20"h. In this control data zone, control data, which is essentially composed of 16 sectors (i.e., 1 ECC block), and has (i) a physical format information explained below (of 1 sector), (ii) a disc production information area (of 1 sector) and (iii) an empty information area (of 14 sectors), is recorded repeatedly by 192 times. Here, as the physical format information, there are recorded the type of the applied DVD standard (e.g., the DVD-ROM, the DVD-RAM, the DVD-RW or the like), the part version, the disc size, the minimum read out rate, the disc structure (e.g., one layer ROM disc, one layer RAM disc, two layers ROM/RAM disc or the like), the record density, the data area allocation, the condition of linear velocity to specify the exposure light amount at the time of recording in the burst cutting area, the reading out power, the peak power, the bias power, various information with regard to the production of the medium and so on. In the empty information area, important data such as copy right protection information or the like is recorded at an arbitrary position therein.

According to the DVD-RW standard, in order to prevent an illegal re-writing operation, emboss pits are randomly formed (buried) in the control data zone consisting of 192 ECC blocks, so that the control data cannot be read out or recorded in this control data area as the unreadable emboss area. Incidentally, according to the DVD-RW standard, the control data is recorded at a different position.

As described above, the control data zone is recorded as a zone where the data cannot be read out or recorded, according to the DVD-RW standard. However, a development of such an optical disc (i.e., the DVD-RW) is demanded that the data cannot be written but the data can be read in the control data zone, which is at the same position as in the case of the DVD video (or the DVD-ROM), so as to enable the reproduction of the DVD-RW by a DVD video player.

However, if the emboss pit is recorded as the data actually readable in the same manner as the CD, the data in the control data zone cannot be read due to the existence of a land pre-pit (indicating a guide signal) on a land portion according to the DVD-RW standard. The land pre-pit signal is necessary to write data to a next area on the DVD-RW. Thus, the land pre-pit cannot be omitted, and thereby data cannot be written by the readable emboss pit in the control data zone as a result.

In this manner, if it is attempted to record data in the control data zone by the emboss pit, since the land pre-pit signal with an adequate signal quality cannot be obtained, it is difficult or impossible to record data into an area immediately after the control data zone, which is a problem.

SUMMARY OF THE INVENTION

It is therefore an object of the present invention to provide an optical disc, and a method of and an apparatus for recording a signal onto the optical disc, which enables to record data into the area immediately after the control data zone and which preserves the compatibility with a conventional optical disc.

The above object of the present invention can be achieved by an optical disc provided with: a disc substrate; an information track formed on the disc substrate spirally or coaxially around a center of the disc substrate, on which an information signal including a physical sector number is to be recorded; and a guide track adjacent to the information track and formed on the disc substrate spirally or coaxially around the center, on which a guide signal including address information is to be recorded, wherein a readable emboss area, in which the information signal is recorded by an emboss pit, and an unreadable emboss area, in which an unreadable emboss pit to disable writing and reading the information signal, are formed on the information track, and the guide signal is not recorded on the guide track corresponding to the readable emboss area and the guide signal is recorded on the guide track corresponding to the unreadable emboss area.

The above object of the present invention can be also achieved by another optical disc provided with: a disc substrate; an information track formed on the disc substrate spirally or coaxially around a center of the disc substrate, on which an information signal including a physical sector number is to be recorded; and a guide track adjacent to the information track and formed on the disc substrate spirally or coaxially around the center, on which a guide signal including address information is to be recorded, wherein a readable emboss area, in which the information signal is recorded by an emboss pit, and an unreadable emboss area, in which an unreadable emboss pit to disable writing and reading the information signal, are formed on the information track, and the guide signal is recorded on the guide track except the guide track corresponding to the readable emboss area.

In one aspect of the optical disc of the present invention, the unreadable emboss area is disposed immediately after the readable emboss area.

In another aspect of the optical disc of the present invention, the address information of the guide signal corresponding to the unreadable emboss area is set on the basis of the address information of the guide signal corresponding to a lead of a data record area of the optical disc.

According to the optical disc of the present invention, it becomes possible to record data into an area immediately after the unreadable emboss area, and an optical disc on which the data cannot be written into the control data zone and the data can be read out in the control data zone can be realized. Further, by adjusting the inconformity of the addresses due to the existence of the unreadable emboss, it is possible to maintain the address compatibility with the disc in the conventional version.

The above object of the present invention can be also achieved by a method of recording an information signal and a guide signal onto the above described optical disc of the present invention. The recording method includes: a process of forming a readable emboss area, in which the information signal is recorded by an emboss pit, and an unreadable emboss area, in which an unreadable emboss pit to disable writing and reading the information signal, on the information track, and a process of recording the guide signal onto the guide track corresponding to the unreadable emboss area, without recording the guide signal on the guide track corresponding to the readable emboss area.

The above object of the present invention can be also achieved by another method of recording an information signal and a guide signal onto an optical disc comprising (i) a disc substrate, (ii) an information track formed on the disc substrate spirally or coaxially around a center of the disc substrate, on which the information signal including a physical sector number is to be recorded and (iii) a guide track adjacent to the information track and formed on the disc substrate spirally or coaxially around the center, on which the guide signal including address information is to be recorded. The recording method includes: a process of forming a readable emboss area, in which the information signal is recorded by an emboss pit, and an unreadable emboss area, in which an unreadable emboss pit to disable writing and reading the information signal, on the information track, and a process of recording the guide signal onto the guide track except the guide track corresponding to the readable emboss area.

In one aspect of the recording method of the present invention, the unreadable emboss area is disposed immediately after the readable emboss area.

In another aspect of the recording method of the present invention, the address information of the guide signal corresponding to the unreadable emboss area is set on the basis of the address information of the guide signal corresponding to a lead of a data record area of the optical disc.

According to the recording method of the present invention, since the unreadable emboss zone is added between the control data zone as the readable emboss zone and the buffer zone which follows the control data zone, or since the unreadable zone is allocated in one portion of the buffer zone which follows the control data zone or one portion of the control data zone, it becomes possible to record the data into the area immediately after the unreadable zone. Further, since the address of the guide track corresponding to the unreadable area is determined so as to make the physical sector number with the conventional DVD-RW version, it becomes possible to maintain the address compatibility with the disc in the conventional version. As long as there is no interruption or disturbance to the operation of recording the data into the data area following the unreadable emboss zone, it is not required to perform a complicated address operation to maintain the compatibility with the DVD-RW of the conventional version.

The above object of the present invention can be also achieved by an apparatus for recording an information signal and a guide signal onto the above described optical disc of the present invention. The recording apparatus includes: an emboss area forming device for forming a readable emboss area, in which the information signal is recorded by an emboss pit, and an unreadable emboss area, in which an unreadable emboss pit to disable writing and reading the information signal, on the information track, and a recording device for recording the guide signal onto the guide track corresponding to the unreadable emboss area, without recording the guide signal on the guide track corresponding to the readable emboss area.

The above object of the present invention can be also achieved by another apparatus for recording an information signal and a guide signal onto an optical disc comprising (i) a disc substrate, (ii) an information track formed on the disc substrate spirally or coaxially around a center of the disc substrate, on which the information signal including a physical sector number is to be recorded and (iii) a guide track adjacent to the information track and formed on the disc substrate spirally or coaxially around the center, on which the guide signal including address information is to be recorded. The recording apparatus is provided with: an emboss area forming device for forming a readable emboss area, in which the information signal is recorded by an emboss pit, and an unreadable emboss area, in which an unreadable emboss pit to disable writing and reading the information signal, on the information track, and a recording device for recording the guide signal onto the guide track except the guide track corresponding to the readable emboss area.

In one aspect of the recording apparatus of the present invention, the recording device allocates a physical sector address of the unreadable emboss area immediately after the readable emboss area.

In another aspect of the recording apparatus of the present invention, the recording device sets the address information of the guide signal corresponding to the unreadable emboss area, to a value based on the address information of the guide signal corresponding to a lead of a data record area of the optical disc.

According to the recording apparatus of the present invention, it becomes possible to record the data into the area immediately after the unreadable emboss area. The data cannot be written into the control data zone but the data can be read out from the control data zone. By adjusting the inconformity of the addresses due to the allocation of the unreadable emboss, it is possible to maintain the address compatibility with the disc in the conventional version.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 2B is a magnified partial perspective view of the DVD-RW showing emboss pits;

DETAILED DESCRIPTION OF THE PREFERRED EMBODIMENTS

Referring to the accompanying drawings, embodiments of the present invention will be now explained.

Figure 1A:
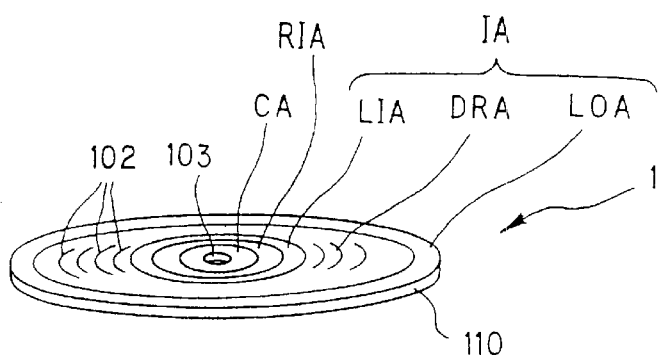
FIG. 1A is a perspective view of the DVD used in embodiments of the present invention.

In FIG. 1A, a DVD-RW 1 is provided with a transparent substrate 110 having a center hole 103 and record tracks 102 spiral or coaxial around the center hole 103. From the inner circumferential side toward the outer circumferential side on the DVD-RW 1, there are formed: a clamping area CA which is clamped by a damper when the DVD-RW 1 is set to an information recording and/or reproducing apparatus; a record information area RIA; and an information area IA. In the information area IA, there are formed a lead in area LIA, a data recordable area DRA and a lead out area LOA in this order from the inner circumferential side. The record tracks 102 are formed in the record information area RIA as well as the information area IA.

Figure 1B:
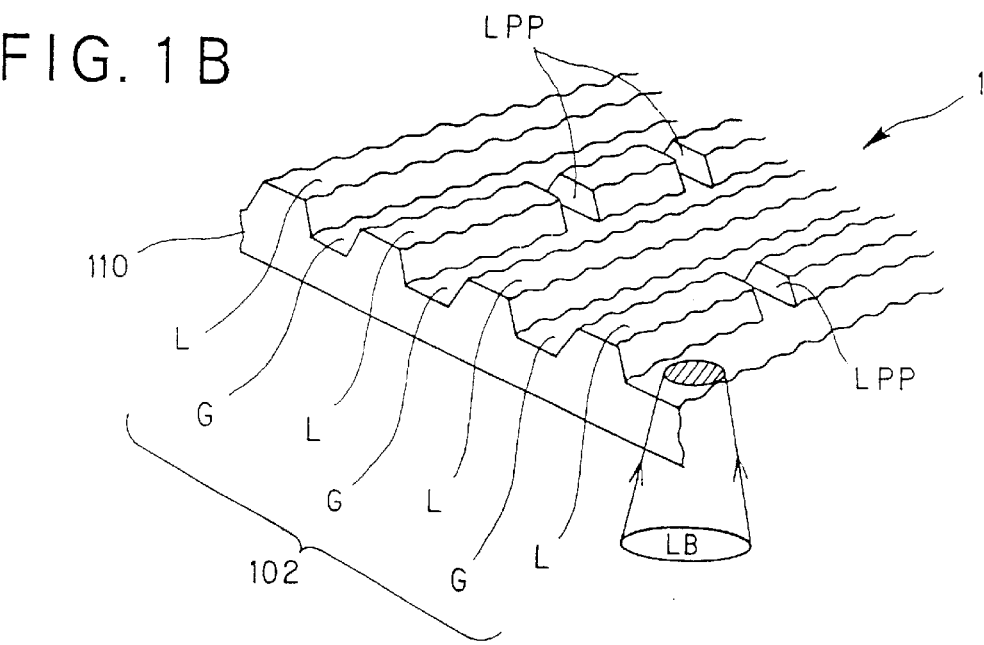
FIG. 1B is a magnified partial perspective view of a transparent substrate of the DVD in FIG. 1A at a portion including record tracks.

As shown in FIG. 1B, the record tracks 102 consist of (i) a land track L comprising a land, which is convex on the transparent substrate 110 and is concave with respect to a laser beam LB for a reading operation and/or a writing operation, and (ii) a groove track G comprising a groove, which is concave on the transparent substrate 110 and is convex with respect to the laser beam LB. On the land track L, a land pre-pit LPP is formed. The land pre-pit LPP is used to define the physical address on the record track 102. The groove track G are wobbled at a predetermined frequency.

On the basis of the information indicated by the land pre-pit LPP and the wobble of the groove track G, a position of an optical pickup in the information recording and/or reproducing apparatus is controlled with respect to the wobble, so that the operation of recording record data onto the groove track G (i.e., a data writing operation) and the operation of reproducing the record data from the groove track G (i.e., a data reading operation) are performed. The record data and/or the control data to control the recording and/or reproducing the record data may be recorded on the land track L in place of or in addition to the groove track G.

Figure 1C:
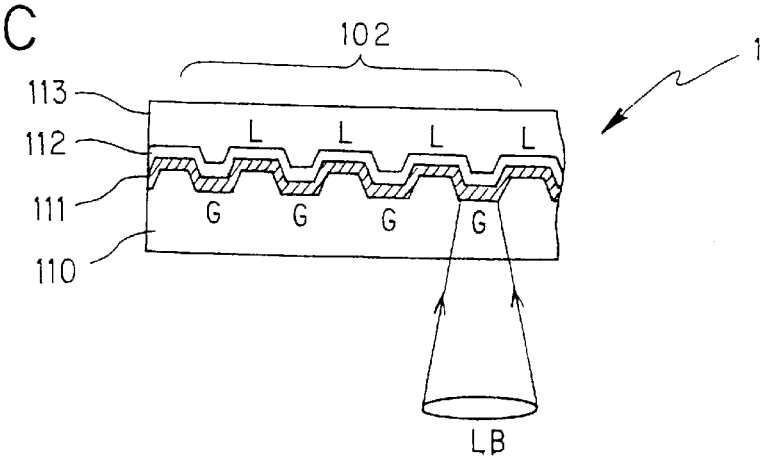
FIG. 1C is a partial sectional view of the DVD in FIG. 1A at a portion including the record tracks.

As shown in FIG. 1C, on the transparent substrate 110, a record layer 111, a light reflective layer 112 and a protection layer 113 are laminated, for example. The record layer 111 may comprise a phase-change material e.g., a material whose phase is changed between a crystalloid phase and an amorphous phase depending upon the irradiation condition of the laser beam. Alternatively, the record layer 111 may comprise a dye e.g., a material whose optical property is changed when a writing laser beam which is stronger than a reading laser beam is irradiated, in case of the DVD-R.

Figure 1D:
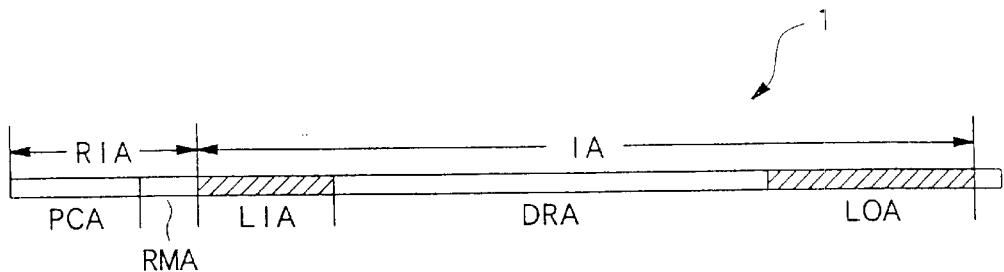
FIG. 1D is a diagram schematically showing a data structure of the DVD-RW used in the embodiments.

FIG. 1D schematically shows a data structure of the DVD-RW 1.

In FIG. 1D, the record information area RIA comprises a power calibration area PCA and a recording management area RMA. The information area IA comprises the lead in area LIA, the data recordable area DRA and the lead out area LOA.

In the data recordable area DRA, (i) various content data such as audio data, video data and the like, and (ii) file management information to manage each main data as a file are recorded.

In the recording management area RMA, the record management data indicating the record conditions of the content data recorded in the data recordable area DRA as well as the lead in area LIA and the lead out area LOA is recorded.

The power calibration area PCA is prepared in order to adjust the light amount of the optical pickup etc., to thereby perform the data writing operation in an appropriate operation status, by performing the trial data writing operation etc., when performing the data writing operation in the information recording and reproducing apparatus.

In the recording management area RMA, the test result data as for the power calibration area PCA is also recorded.

In the lead in area LIA, the record management data indicative of the physical information of the disc is recorded.

The lead out area LOA is formed at an end position of the main data recorded in the data recordable area DRA. In the lead out area LOA, the data of (00)h is recorded. The start position of recording the lead out area LOA is changed depending upon the data amount of the main data.

The areal addresses of those areas PCA, RIA, LIA, DRA and LOA and the record addresses of the data are set in accordance with the ECC block address recorded in the land pre-pit LPP.

Figure 2A:
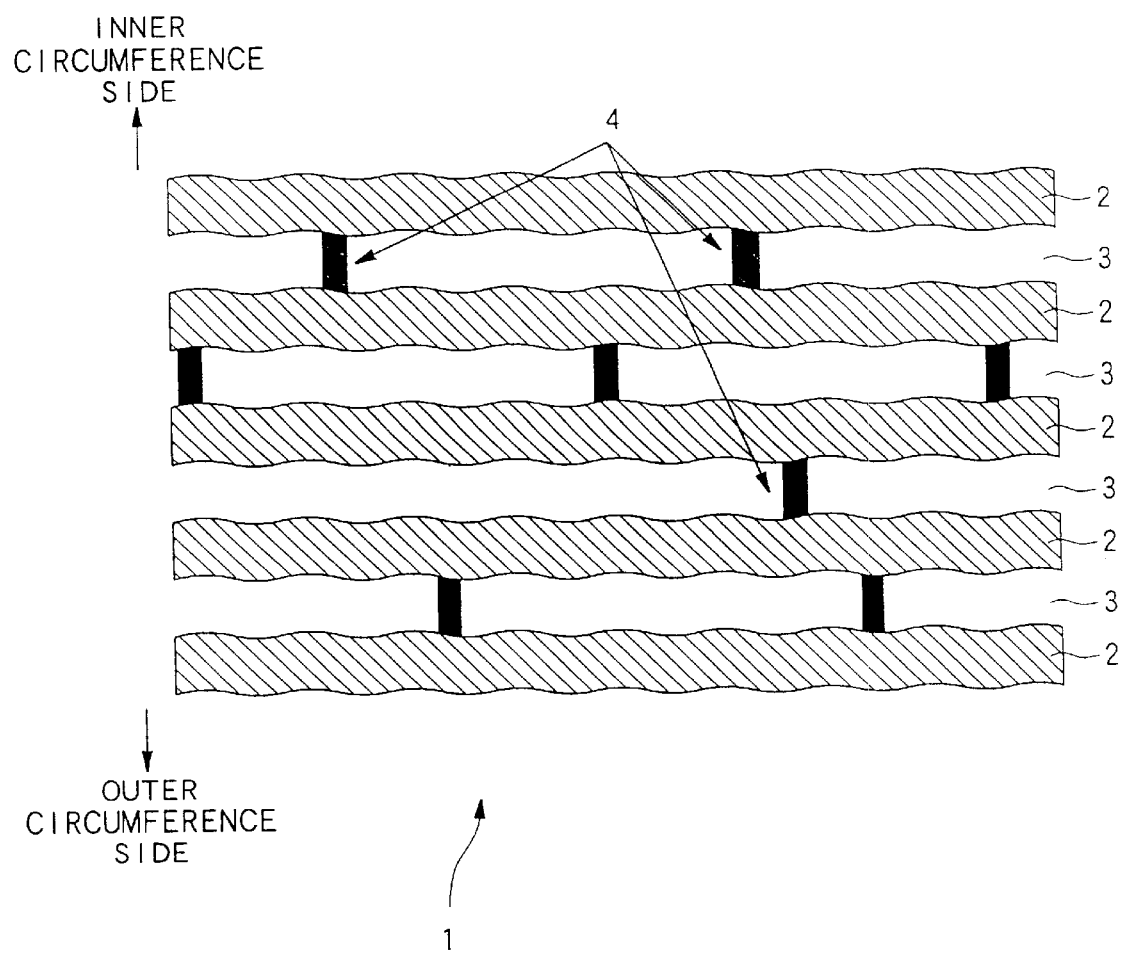
FIG. 2A is a diagram showing a positional relationship between a groove and a land of the DVD-RW shown in FIG. 1D.

FIG. 2A shows a diagram showing a positional relationship between the groove and the land in the DVD-RW.

In FIG. 2A, a groove track 2 and a land track 3 are spirally or coaxially disposed adjacent to each other. A physical sector number of the groove track 2 is generated with referring to the address information of a land pre-pit 4 (indicating a guide signal), which is written on the land track 3 (as a guide track), and the information signal is recorded onto the groove track 2, in the operation.

Here, a physical structure of an emboss pit is explained with reference to FIG. 2B.

As shown in FIG. 2B, in the DVD-RW, the unreadable emboss pits are formed as intermittent groove tracks separated by portions of the transparent substrate at an approximately same level as the land track 3. Namely, the emboss pit is convex on the groove track 2 with respect to the light beam LB. Thus, the reflection coefficient of the groove track 2 is decreased at the emboss pit. Incidentally in FIG. 2B, the wobble of the groove track 2 is omitted for the sake of simplicity, and a light spot SP whose diameter is larger than the width of the groove track 2 is formed of the light beam LB.

Figure 3:
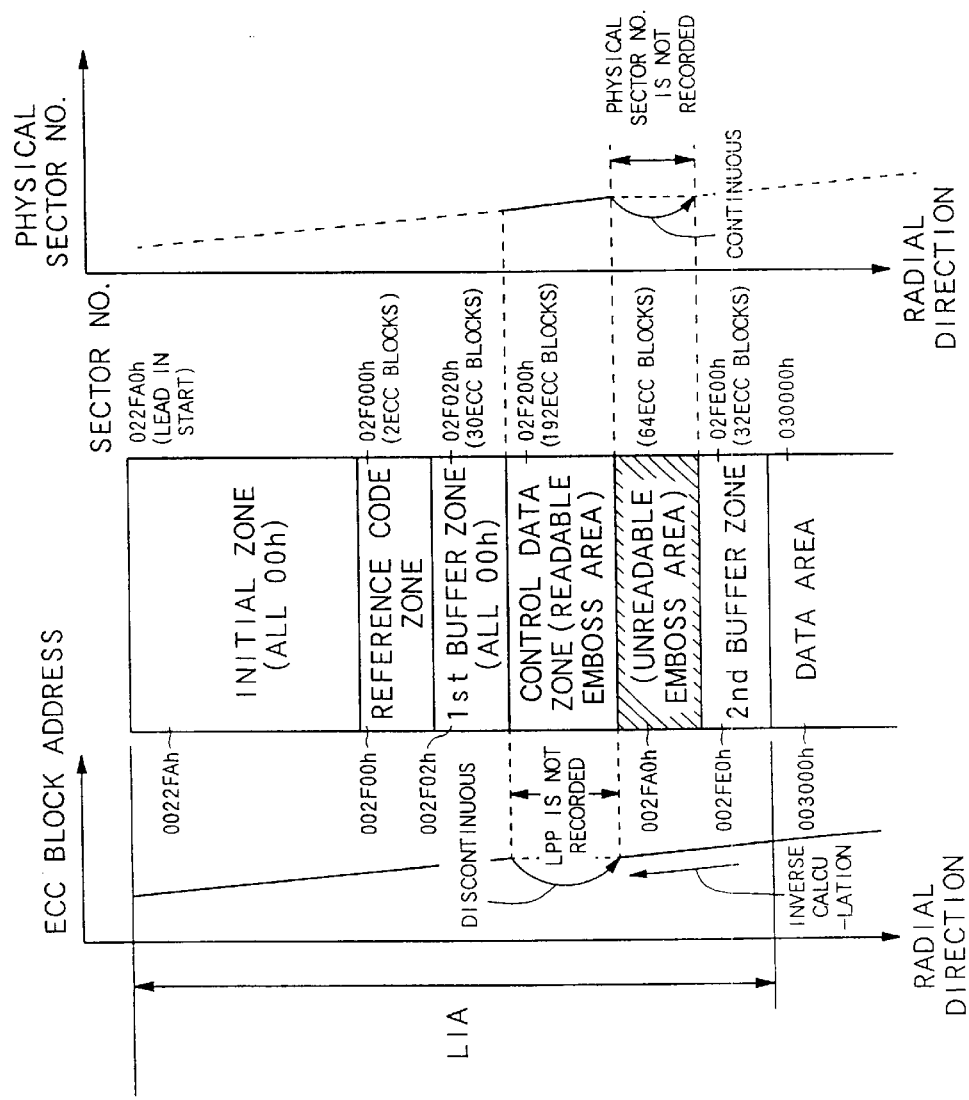
FIG. 3 is a diagram showing a detailed structure of a lead in area shown in FIG. 1D in one embodiment.

FIG. 3 shows the details of the lead in area LIA.

In FIG. 3, an initial zone is formed at a start position of the lead in area LIA, which belongs to an unreadable emboss data zone where the rewriting operation is not possible. The data of "00"h indicative of a blank is set to this initial zone. Following this initial zone, a reference code zone is formed. In this reference code zone, an emboss reference code is recorded. A code word is repeatedly recorded which is in the conversion table set in advance as the emboss reference code. The apparatus is set such that this predetermined code word can be correctly read out, in other words, the code word can be read out within a predetermined error rate range. Following to this reference code zone, a first buffer zone is allocated in which all data "00"h are set which imply a blank again.

In a control data zone in the emboss data zone, there are recorded the type of the applied DVD standard (e.g., the DVD-ROM, the DVD-RAM, the DVD-RW or the like), the part version, the disc size, the minimum read out rate, the disc structure (e.g., one layer ROM disc, one layer RAM disc, two layers ROM/RAM disc or the like), the record density, the data area allocation, the condition of linear velocity to specify the exposure light amount at the time of recording in the burst cutting area, the reading out power, the peak power, the bias power, various information with regard to the production of the medium and so on.

In the present embodiment, an unreadable emboss area is formed between this control data zone and a second buffer zone which is blank. In the control data zone, the control data is recorded by a deep emboss pit (whose depth is 70 to 80 nm) which starts from the sector number of "02F200"h, and the land pre-pit 4 which may become the obstacle when reading is not recorded. Then, an unreadable emboss area is formed. In this unreadable emboss area, the land pre-pit 4 is inserted and the shallow emboss pit (whose depth is about 20 nm) is recorded on the basis of dummy data so that the information signal cannot be recorded or reproduced.

As the land-pre pit 4 is interrupted, the rising up upon recording the data onto the second buffer zone following it is degraded. Thus, the unreadable emboss area of 64 ECC blocks is formed following to this control data zone. In this unreadable emboss area, the land pre-pit 4 is inserted, and thereby a shallow emboss pit based on the dummy data is recorded so that the information signal cannot be recorded or reproduced. In the second buffer zone next to it, the blank data "00"h is recorded and the lead in area is ended.

In this manner, since the unreadable emboss area having the 64 ECC blocks for example is newly added between the control data zone having the 192 ECC blocks and the buffer zone, mismatching or unconformity of the address is generated with respect to the conventional DVD-RW version. Therefore, the address of the guide track corresponding to the unreadable emboss area is determined so as to match the physical sector number with the conventional DVD-RW version. Namely, since the physical sector number is made continuous before and after the unreadable emboss area, and since the length of the ECC block address is different in length between the readable emboss area and the unreadable emboss area, the ECC block address is not continuous before and after the unreadable emboss area. Therefore, it is necessary to absorb the difference of the address of the 192 ECC blocks and the address of the 64 ECC blocks by the buffer zone.

For this reason, to the address information of the guide signal corresponding to the unreadable emboss area, the value based on the address information of the guide signal corresponding to the lead of the data area (e.g., the ECC block address "003000"h) is set. Namely, to the lead address of the unreadable emboss area, the value (i.e., "002FA0"h) which is obtained by subtracting (i) the 64 ECC blocks (i.e., "000040"h) as the length of the unreadable emboss area and (ii) the 32 ECC blocks ("000020"h) as the length of the buffer zone from the lead address "003000"h as the lead address of the data area is set.

Figure 4A:
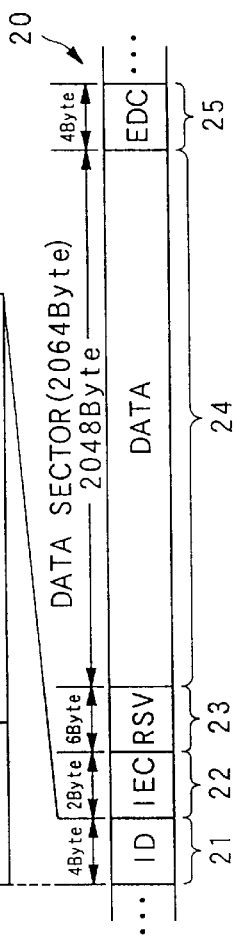
FIG. 4A is one diagram showing a data structure in a signal record format of the DVD-RW in the embodiments.
Figure 5:
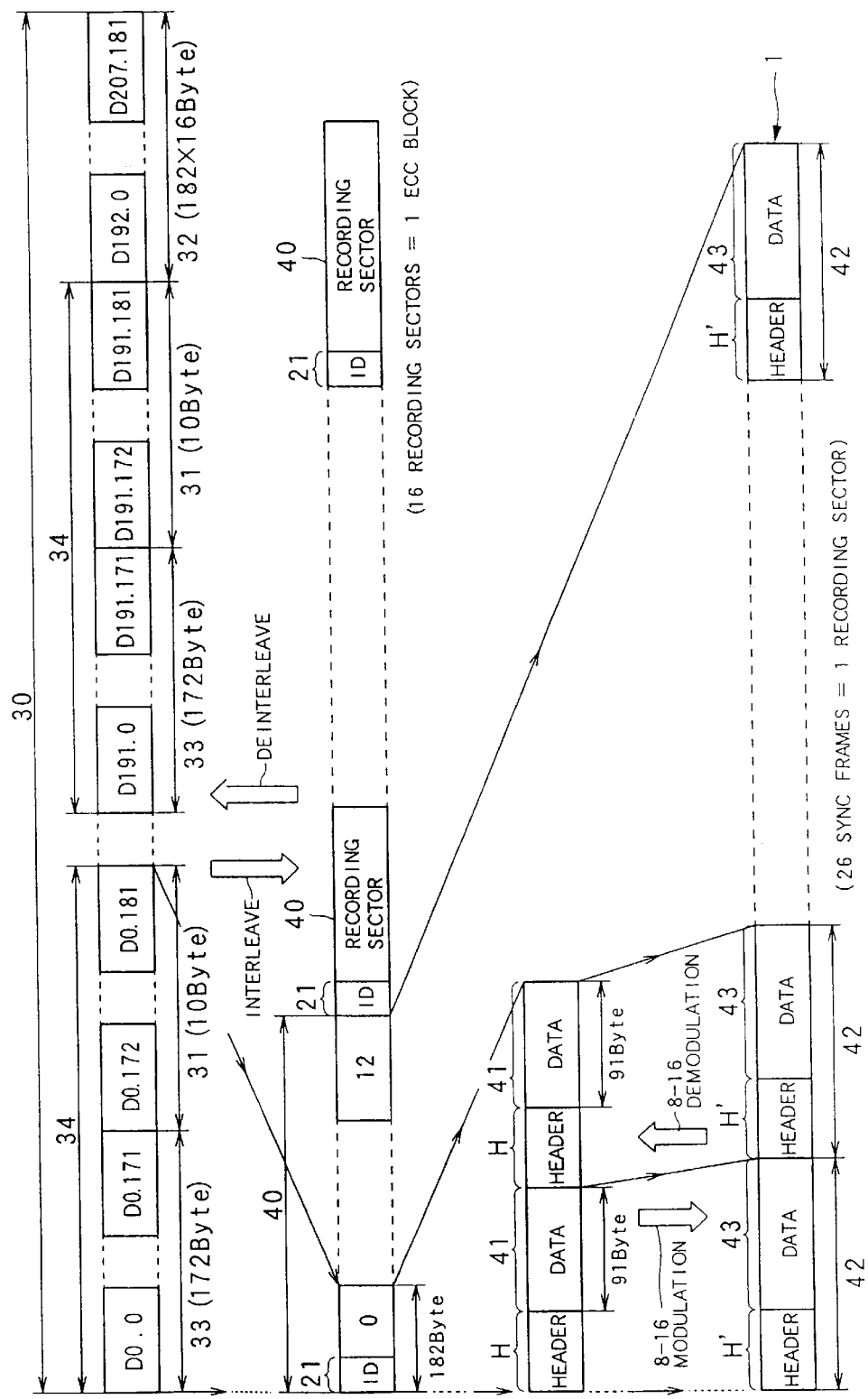
FIG. 5 is another diagram showing a data structure in the signal record format of the DVD-RW in the embodiments.

FIG. 4A, FIG. B and FIG. 5 show the signal record format of the DVD-RW used in the present embodiment. Here, the physical format upon recording the record information onto the DVD-RW and the error correction process for the record information are explained with reference to those figures.

At first, the error correction in the DVD-RW and the ECC block as an error correction unit in the error correction process are explained with reference to FIG. 4A and FIG. 4B.

The record information recorded on the DVD-RW is constructed to have a physical structure including a plurality of data sectors 20 shown in FIG. 4A. Then, one data sector 20 includes, in the order from the lead thereof, (i) ID information 21 indicating a start position of the data sector 20, (ii) an ID information error correction code IEC (ID data Error Correction code) 22 to correct the error in the ID information 21, (iii) reserved data 23, (iv) data 24 which is the main data to be recorded and (v) an error detection code EDC (Error Detection Code) 25 to detect an error in the data 24. The record information to be recorded is constructed as a plurality of data sectors 20 are sequentially continued. The ID information 21 is constructed by 4 bytes in total of the sector information having 1 byte and the sector number having 3 bytes. As the sector information, there are a layer to which the sector number belongs, the area and the like.

Next, the process of constructing the ECC block by using the data sector 20 is explained with reference to FIG. 4B. When constructing the ECC block by using the data sector 20, at first, one data sector 20 is divided for each 172 bytes, and the respective divided data (which are referred to as "data blocks 33" hereinbelow) are arranged in a vertical direction as shown in FIG. 4B at its left portion. At this time, 12 lines of data blocks 33 are arranged in the vertical direction. Then, the ECC parity in code (PI (Parity In) code) 31 having 10 bytes is added to the end of the respective one of the data blocks 33 arranged in the vertical direction, so as to construct one correction block 34 as shown in FIG. 4B at its right portion. At this stage, the correction blocks 34 to each of which the ECC parity in code 31 is added are arranged in 12 lines. After that, this process is repeated for 16 data sectors 20. By those processes, the correction blocks 34 having 192 lines are obtained.

Next, in such a condition that the correction blocks 34 in the 192 lines are arranged in the vertical direction, the correction blocks 34 in the 192 lines are divided in the vertical direction from the beginning thereof for each one byte, and 16 ECC parity out codes (PO (Parity Out) codes) 32 are added to the respective one of the divided data. Incidentally, the ECC parity out code 32 is added to the portion of the ECC parity in code 31 among the error correction block 34.

Figure 4B:
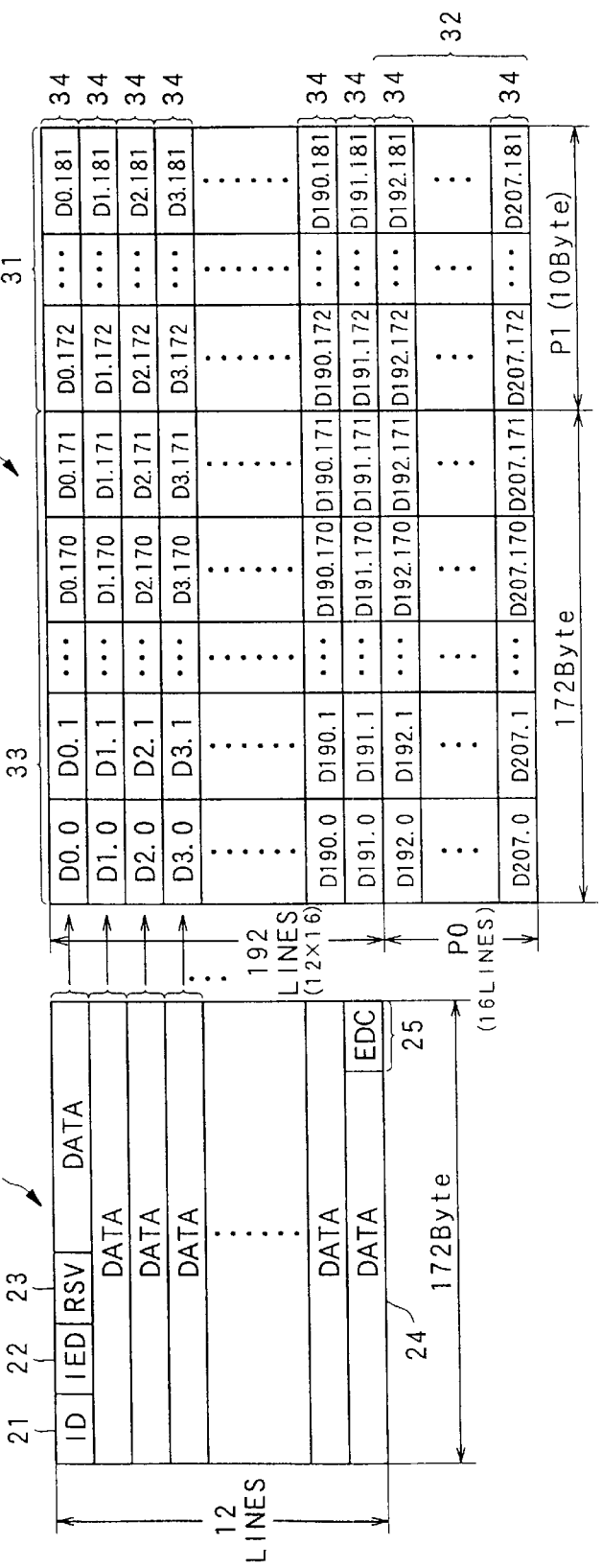
FIG. 4B is another diagram showing a data structure in the signal record format of the DVD-RW in the embodiments.

By the above mentioned processes, one ECC block 30 including 16 data sectors 20 are formed as shown in FIG. 4B at its right portion. At this time, the total amount of the information included in one ECC block 30 is (172+19) bytes×(192+16) lines=37856 bytes. Among these, the actual data 24 is 2048 bytes×16 lines=32768 bytes. Further, in the ECC block 30 shown in FIG. 4B at its right portion, the one byte data is indicated by "D#.*". For example, "D1.0" indicates the one byte data which is disposed at the $1^{st}$ line and the $0^{th}$ column. "D190.170" indicates the one byte data which is disposed at the $190^{th}$ line and the $170^{th}$ column. Therefore, the ECC parity in code 31 is disposed at the $172^{nd}$ column to the $181^{st}$ column. The ECC parity out code 32 is disposed at the $192^{nd}$ line to the $207^{th}$ line.

Further, one correction block 34 is recorded continuously on the DVD-RW. Here, the reason why the ECC block 30 is constructed to include both of the ECC parity in code 31 and the ECC parity out code 32 as shown in FIG. 4B at its right portion is that the correction of the data arranged in the horizontal direction in FIG. 4B at its right portion is performed by use of the ECC parity in code 31, and the correction of the data arranged in the vertical direction in FIG. 4B at its right portion is performed by using the ECC parity out code 32.

Namely, in the ECC block 30 shown in FIG. 4B at its right portion, it is possible to perform the error correction redundantly in the horizontal direction and the vertical direction, so that the error correction more powerful than the conventional error correction process used for the conventional CD or the like can be performed.

More concretely as for this point, for example, even if all of one correction block 34 (which includes the data of 182 bytes in total including the ECC parity in codes 31 in one line amount and is recorded continuously on the DVD-RW as mentioned above) is destroyed by a scratch etc., of the DVD-RW, it is the data destruction of merely one byte with respect to the ECC parity out code 32 in one column if it is seen from the vertical direction. Therefore, even if one correction block 34 is completely destroyed, it is possible to correctly reproduce the data by performing the error correction as long as the correction using the ECC parity out code 32 of the respective one of the columns is performed.

Next, how to record the data sector 20, which is constructed in the ECC block 30 as shown in FIG. 4B at its right portion, onto the DVD-RW is explained with reference to FIG. 5. In FIG. 5, the data indicated by "D#.*" corresponds to the data described within FIG. 4B at its right portion.

When recording the ECC block 30 onto the DVD-R, at first, the ECC blocks 30 are arranged in one row in the horizontal direction for each correction block 34 to be thereby interleaved as shown in FIG. 5 at its top portion, so that the ECC block 30 is divided into the 16 recording sectors 40. At this time, one recording sector 40 includes the information of 2366 bytes (i.e., 37856 bytes÷16). The data sector 20 and the ECC parity in code 31 or the ECC parity out code 32 are mixed in this one recording sector 40. At the lead of each recording sector 40, the ID information 21 of the data sector 20 (referring to FIG. 4A) is disposed.

Then, each recording sector 40 is divided into the data 41 for each 91 bytes, and a header H is added to each of them. After that, by 8–16 modulating the recording sector 40 in this status, one synchronization frame 42 is formed for each data 41. At this time, one synchronization frame 42 is constructed by the header H and the data 43. The information amount within one synchronization frame 42 is 91 bytes×8×(16/8)=1456 bytes. The information is written onto the DVD-RW in such a condition that the synchronization frames 42 are continued. At this time, one recording sector 40 includes 26 synchronization frames 42.

By constructing the above explained physical format and thereby recording the information onto the DVD-RW, if the 8–16 demodulation and the de-interleave are performed upon reproducing the information from the DVD-RW (refer to FIG. 5), it is possible to recover the original ECC block 30, so that it is possible to correctly reproduce the information while performing the powerful error correction.

Figure 6:
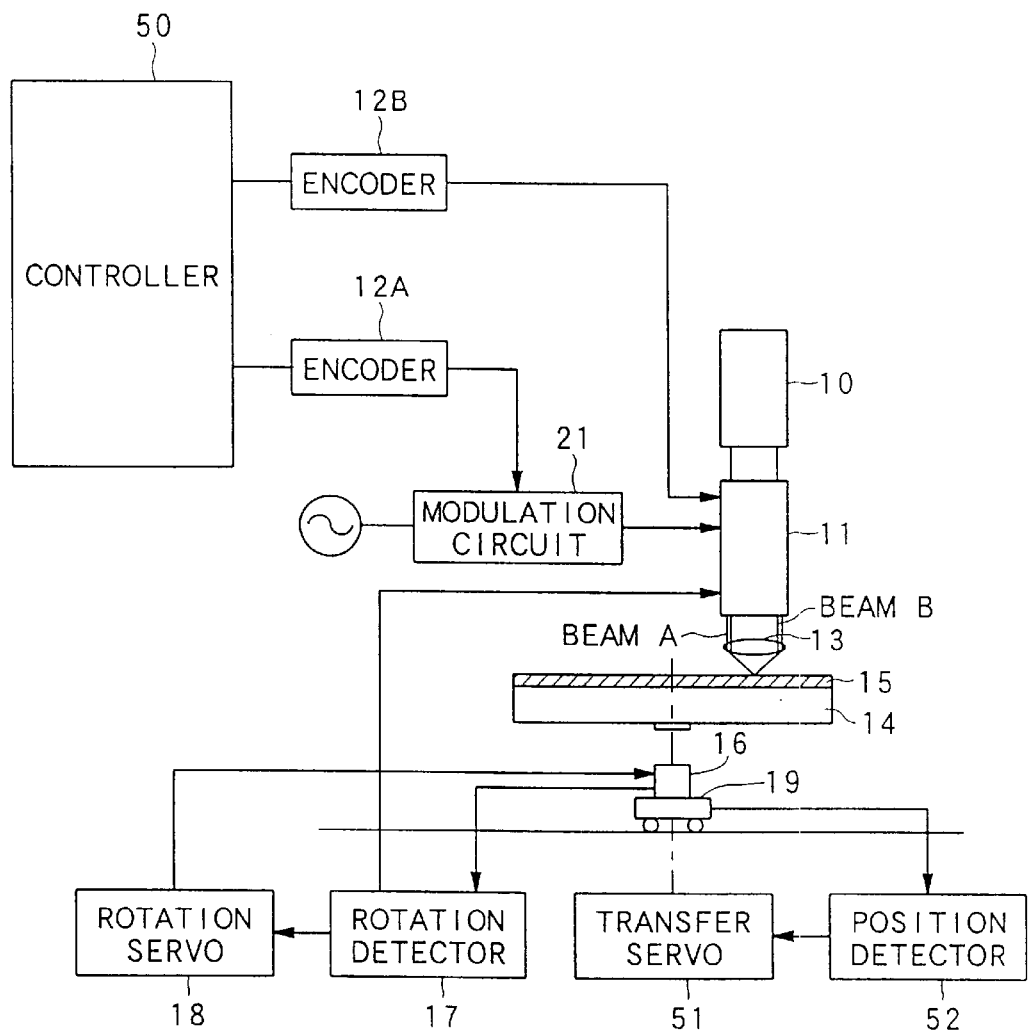
FIG. 6 is a block diagram showing an internal structure of a disc production apparatus, to which the signal recording method of the present invention is applied, in the embodiments.
Figure 7:
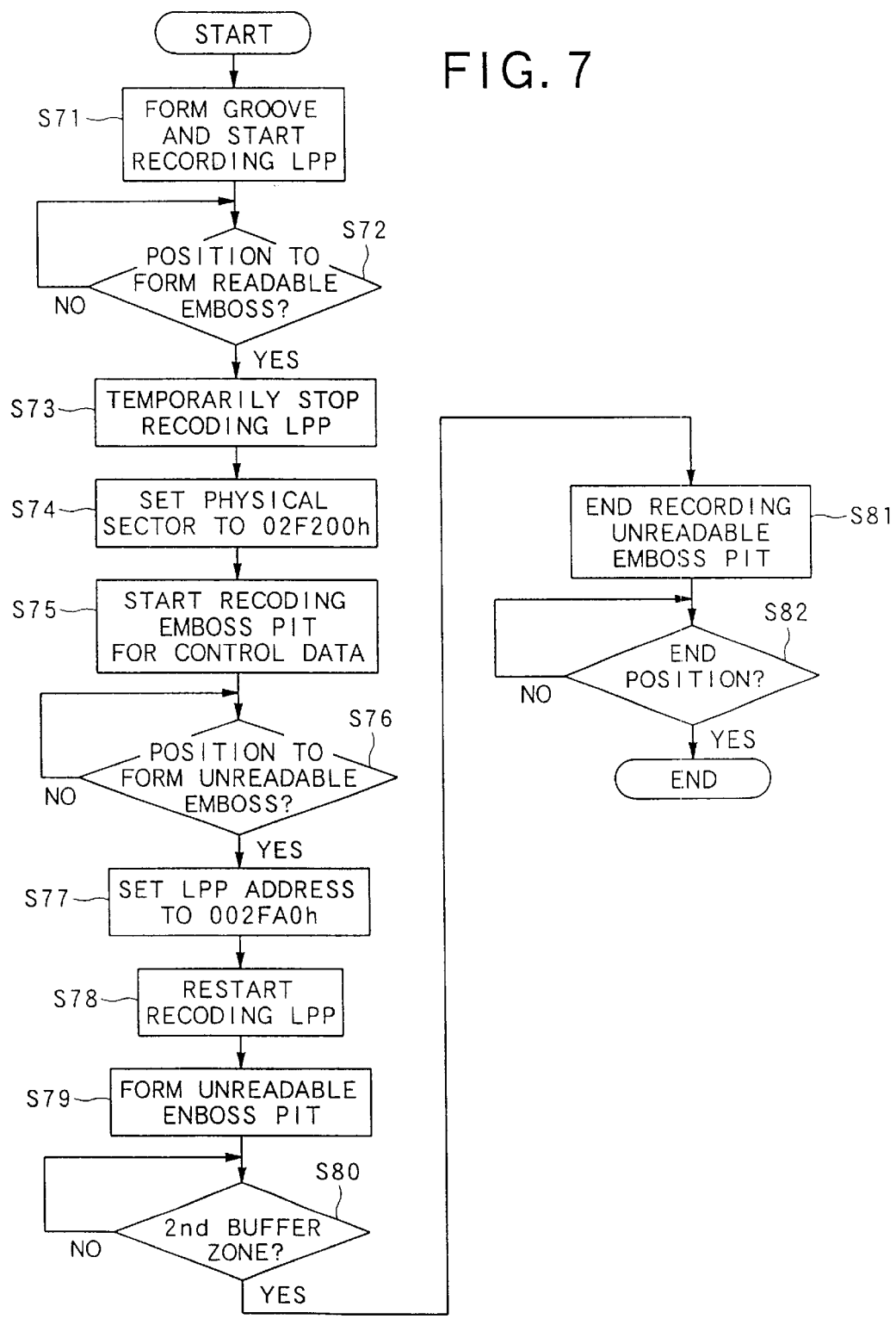
FIG. 7 is a flowchart showing an operation procedure of a disc production apparatus shown in FIG. 6.
Figure 8:
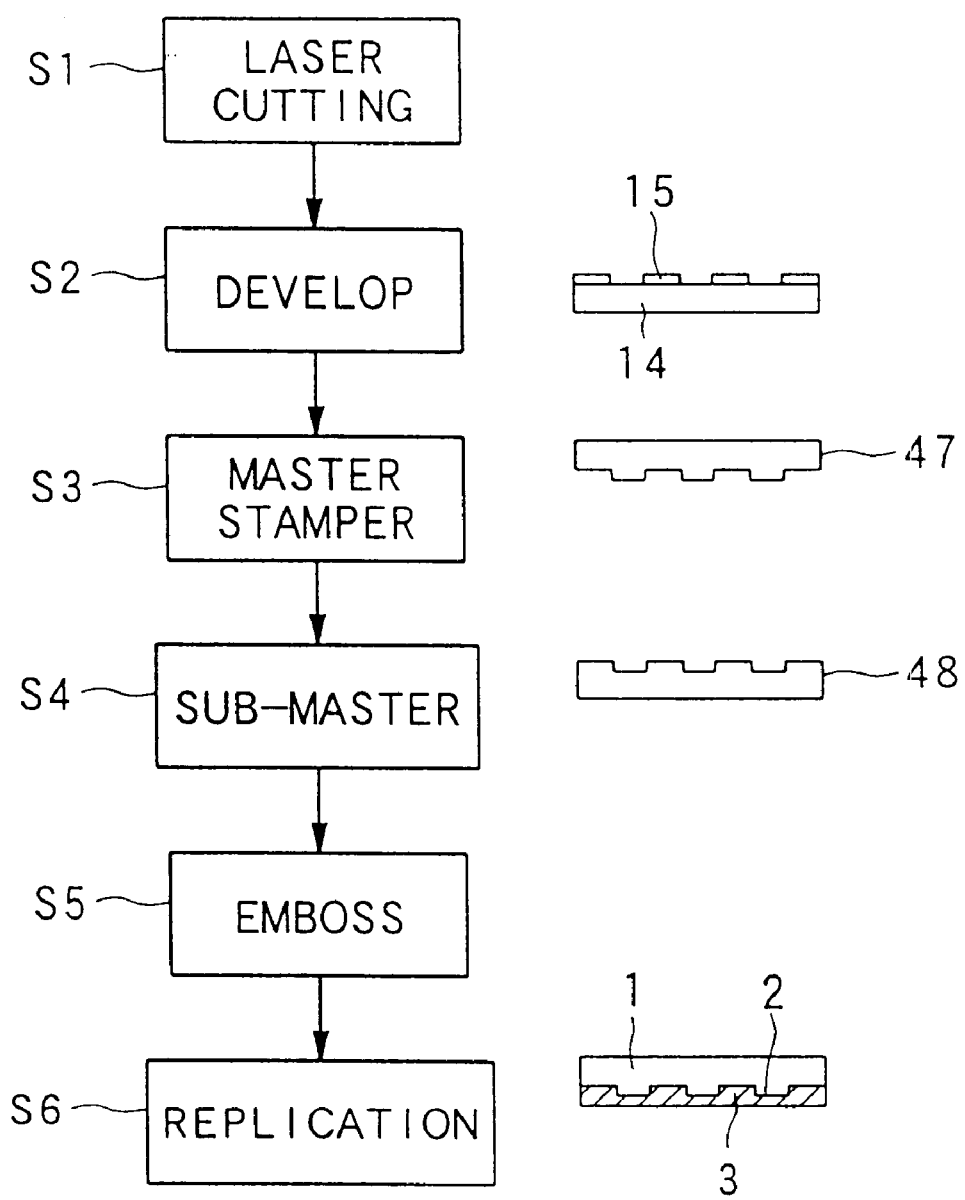
FIG. 8 is a process chart showing a method of producing the disc of the embodiment.

FIG. 6 to FIG. 8 are diagrams explaining the operation of the embodiment, and respectively showing the internal structure of the disc production apparatus, the flowchart of its operation and the procedures of the disc production method.

In the present embodiment, a disc production apparatus shown in FIG. 6 is used in order to produce the optical disc.

As shown in FIG. 8, when producing the DVD-RW, a laser cutting operation by use of the disc production apparatus is performed at first (step S1). More concretely, a photo-resist 15 is formed on a glass substrate 14 and is exposed by a light beam so as to form a pattern of the photo-resist 15 corresponding to the groove track G, the land track L and the land pre-pit LPP as well as the emboss pit. Then, the exposed photo-resist 15 is developed, so that the pattern of the photo-resist 15 is formed on the glass substrate 14 (step S2). Then, a master stamper 47 (i.e., a so-called stamper disc) is formed by using this pattern of the developed photo-resist 15 (step S3). Then, a sub-master stamper 48 is formed by applying the electrocasting process once with respect to the master stamper 47 (step S4). Alternatively, a stamper may be obtained by applying the electrocasting process even times with respect to this sub-master stamper 48. Then, an emboss process may be performed (step S5), and the DVD-RW 1 having the groove 2 and the land 3 is finally produced by an replication process using the sub-master stamper 48 (step S6). By the above mentioned laser cutting process, since the cutting process of the original disc is performed just once, the pre-pit 4 is not drifted on the land 3, so that the DVD-RW 1 which is quite accurate can be produced.

FIG. 6 shows a disc production apparatus using the above mentioned laser cutting operation.

In FIG. 6, the disc production apparatus is provided with: a laser generating device 10 of large output type for emitting a laser beam; a light modulator 11 for modulating the laser beam from the laser generating device 10; an objective lens 13 for collecting the modulated laser beam so as to form a light spot on the photo-resist 15 on the glass substrate 14; encoders 12A and 12B for encoding land cutting information; a controller 50 for controlling the encoders 12A and 12B as well as other constitutional elements; and a modulation circuit 21 for modulating a signal from the encoder 12A. The disc production apparatus is also provided with: a spindle motor 16 for rotating the glass substrate 14; a transfer unit 19 for transferring the spindle motor 16; a transfer servo circuit 51 for transfer-servo-controlling the transfer unit 19; and a position detector 52 for detecting a position of the transfer unit 19 and sending a position signal to the transfer servo circuit 51. The disc production apparatus is further provided with: a rotation servo circuit 18 for rotation-servo-controlling the spindle motor 16; and a rotation detector 17 for detecting a rotation number of the spindle motor 16 and sending a rotation signal to the rotation servo circuit 18.

Figure 10:
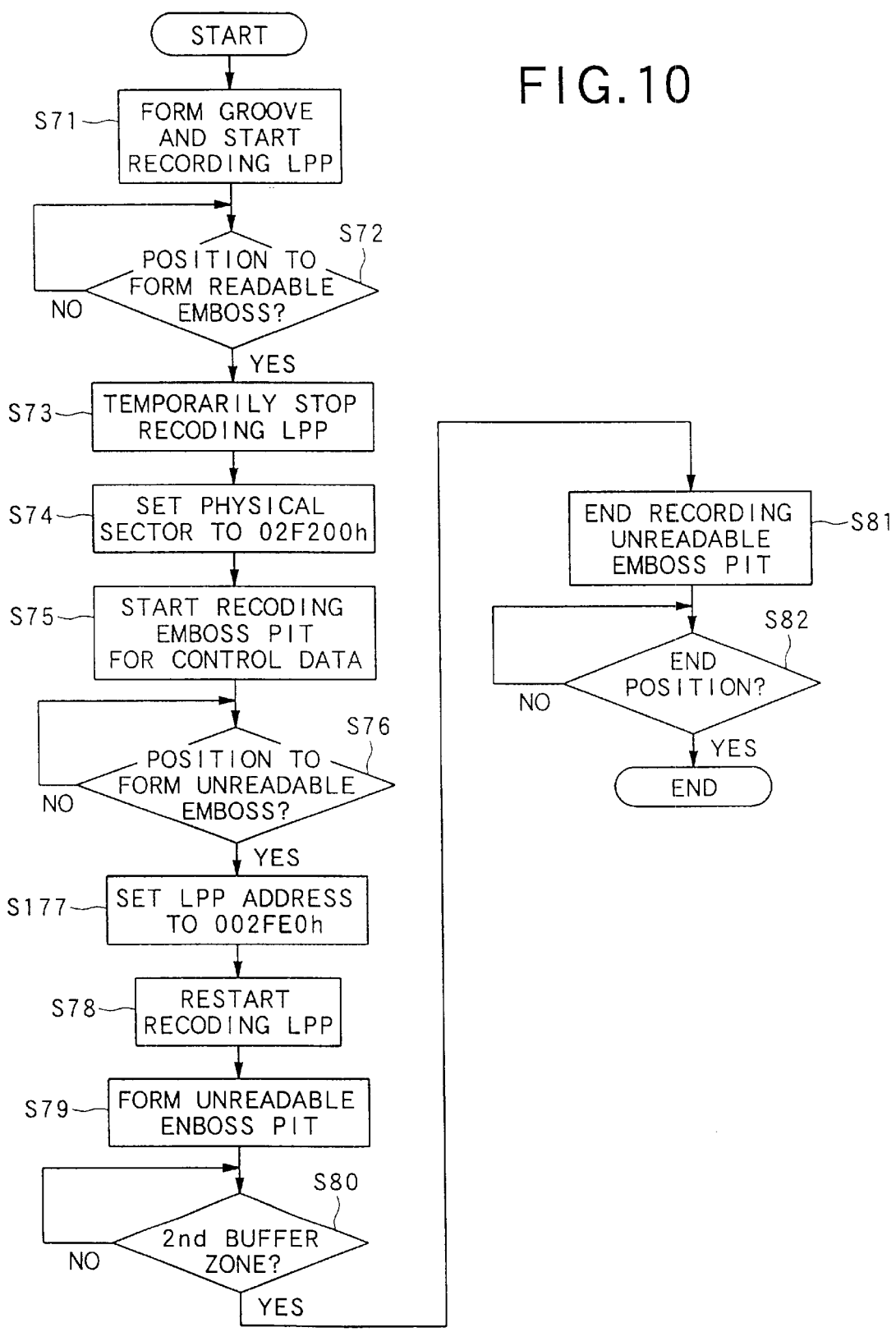
FIG. 10 is a flowchart showing an operation procedure of a disc production apparatus to producing a disc corresponding to FIG. 9.

In operation, the laser beam A is modulated by the light modulator 11 so as to form the groove, on the basis of the land cutting information sent from the encoder 12A. The laser beam B is modulated by the light modulator 11 so as to form the land pre-pit. The control procedures under the control of the controller 50 are shown in FIG. 7 and FIG. 10 respectively.

The glass substrate 14 is set to the spindle motor 16. The spindle motor 16 is rotated at a constant linear velocity (CLV) by virtue of the rotation detector 17 and the rotation servo circuit 18. The spindle motor 16 is transferable in the radial direction of the glass substrate 14 by virtue of the transfer unit 19. The land portion is cut in a spiral shape from the disc central side toward the disc outer circumferential side on the resist surface of the glass substrate 14 by controlling the transfer in the radial direction at a predetermined transfer velocity by virtue of the position detector 52 and the transfer servo circuit 51.

Next, the operation of the disc production apparatus to which the signal recording method of the present invention is applied is explained with reference to the flowchart of FIG. 7.

At first, the wobbled groove is formed by the laser beam A, and the land pre-pit is formed by the laser beam B (step S1). Since the portion where the information pit is to be formed in the lead in area is the unreadable emboss area following the readable emboss area in the control data zone, it is firstly judged whether or not it is the position to form the readable emboss by the position detector 52 (step S72). When arriving at the position to form the readable emboss in the control data zone after passing the initial zone, the reference zone and the buffer zone, the supply of the laser beam B is stopped so as to temporarily stop recording the land pre-pit (step S72). Then, the physical sector number is set to "02F200"h, and the operation of recording the readable emboss pit in the control data zone is started (step S75). Here, by modulating the laser beam A, the control data is recorded while forming the wobbled groove by the laser beam A. Also, in order to form the deep readable emboss pit, the laser power of the laser beam A is increased in the control data zone.

After the 192 ECC blocks are written by repeating the above mentioned processes while sequentially updating the physical sector number after the start address "02F200"h of the control data zone, it is judged whether or not the position to form the unreadable emboss is detected by the position detector 20 (step S76). When the position to form the unreadable emboss is detected by the position detector 20 (step S76: YES), the controller 50 sets the ECC block address of the land pre-pit 4 forcedly to "002FA0"h and then restarts recording the land pre-pit 4 (steps S77 and S78). Here, the formation of the land pre-pit 4 is restarted by the laser beam B. Next, the unreadable emboss pit is formed while wobbling it by the laser beam A in the amount of 64 ECC blocks (step S79). Then, it is judged whether or not the lead ECC block address "003000"h of the second buffer zone is detected (step S80). When the lead ECC block address "003000"h of the second buffer zone is detected (step S80: YES), the modulation of the beam A is stopped, and the operation of recording the unreadable emboss pit is ended (step S81). After that, while forming the wobbled groove by the laser beam A and forming the land pre-pit 4 by the laser beam B again, the arrival at the end position i.e., the external circumference is monitored (step S82). When finally arriving at the external circumference, the pertinent processes are ended (step S82).

Figure 9:
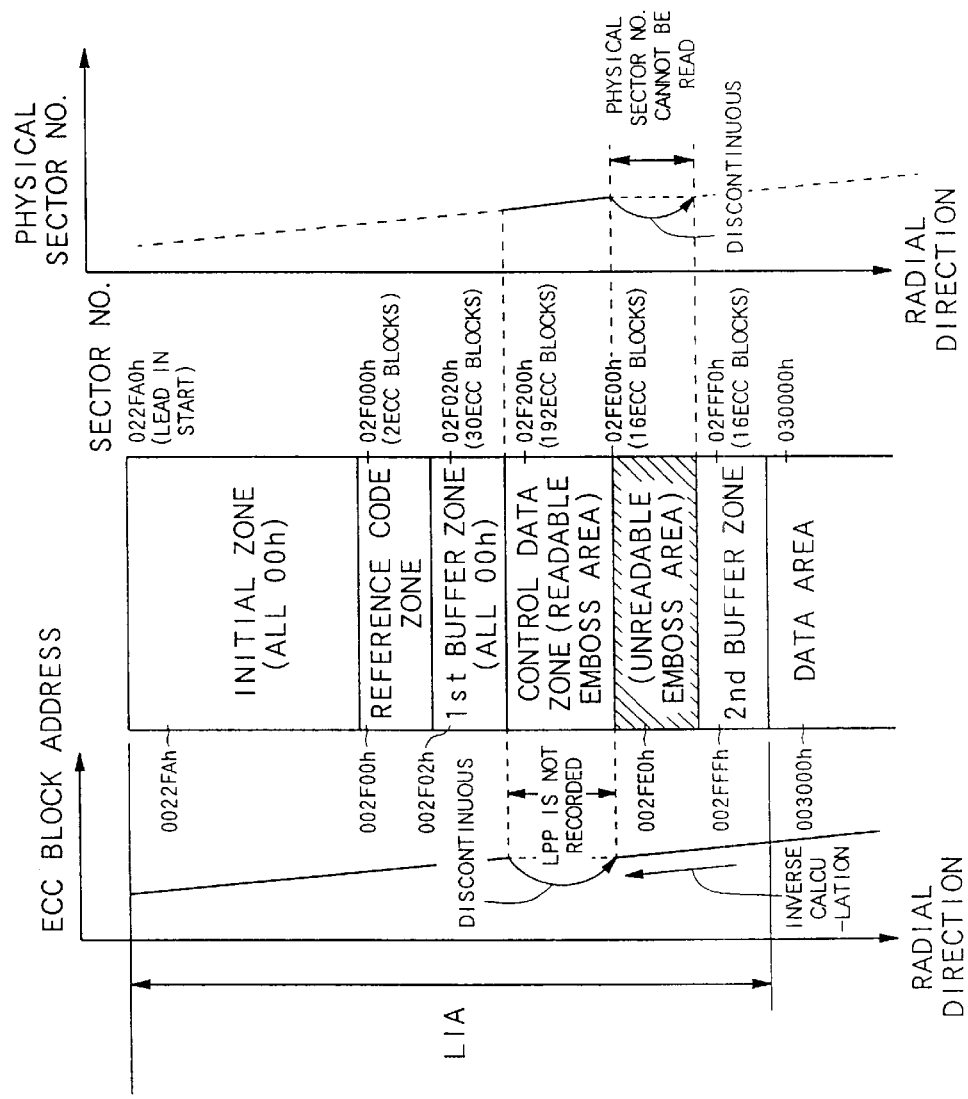
FIG. 9 is a diagram showing a detailed structure of a lead in area in another embodiment.

FIG. 9 is a diagram showing another embodiment of the lead in area, and FIG. 10 is a flowchart showing the operation of the disc production apparatus to realize this another embodiment. In FIG. 10, the same steps as those in FIG. 7 carry the same step numbers, and the explanations thereof are omitted.

The difference between this embodiment shown in FIGS. 9 and 10 and the embodiment shown in FIG. 3 is that, while the unreadable emboss area is allocated between the control data zone as the readable emboss zone and the buffer zone following it (refer to the step S77 in FIG. 7 etc.,) in the embodiment shown in FIG. 7, the unreadable emboss area is allocated in the half of the buffer zone following the control data zone (at a step S177 in FIG. 10) in the embodiment shown in FIGS. 9 and 10.

In case that this unreadable emboss zone is 16 ECC blocks, it is required to forcedly set the ECC block address "002FE0"h (at the step S177) when the position to form the unreadable emboss is detected (at the step S76). Other points of the embodiment shown in FIGS. 9 and 10 are the same as those of the embodiment shown in FIG. 3, and the explanations thereof are omitted.

In addition, according to the present method shown in FIGS. 9 and 10, different from the embodiment shown in FIG. 3, it is not necessary to perform a complicated address operation in order to obtain the compatibility with the conventional DVD-RW version. Therefore, as long as the writing and/or reading operation in the data area is not interrupted, it is effective since the processing load for the address control is reduced.

Figure 11:
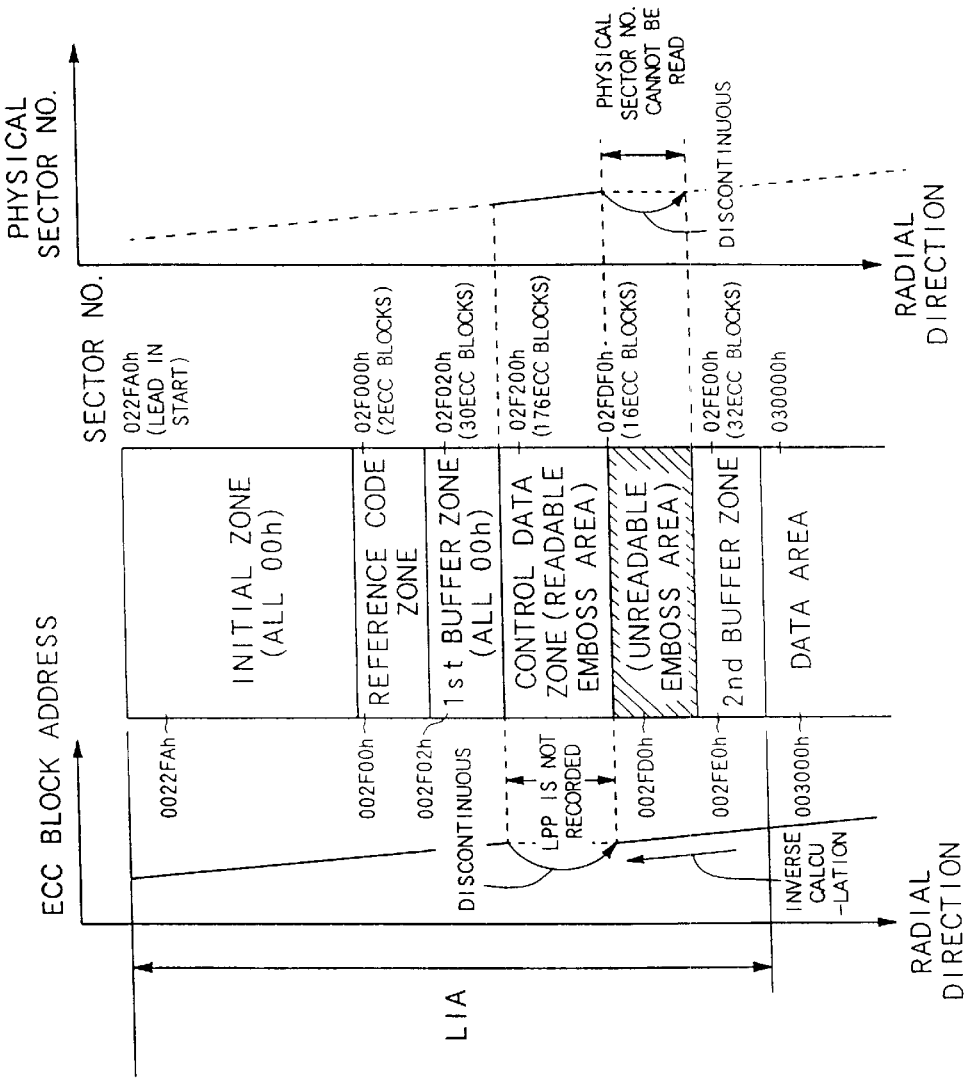
FIG. 11 is a diagram showing a detailed structure of a lead in area in another embodiment.
Figure 12:
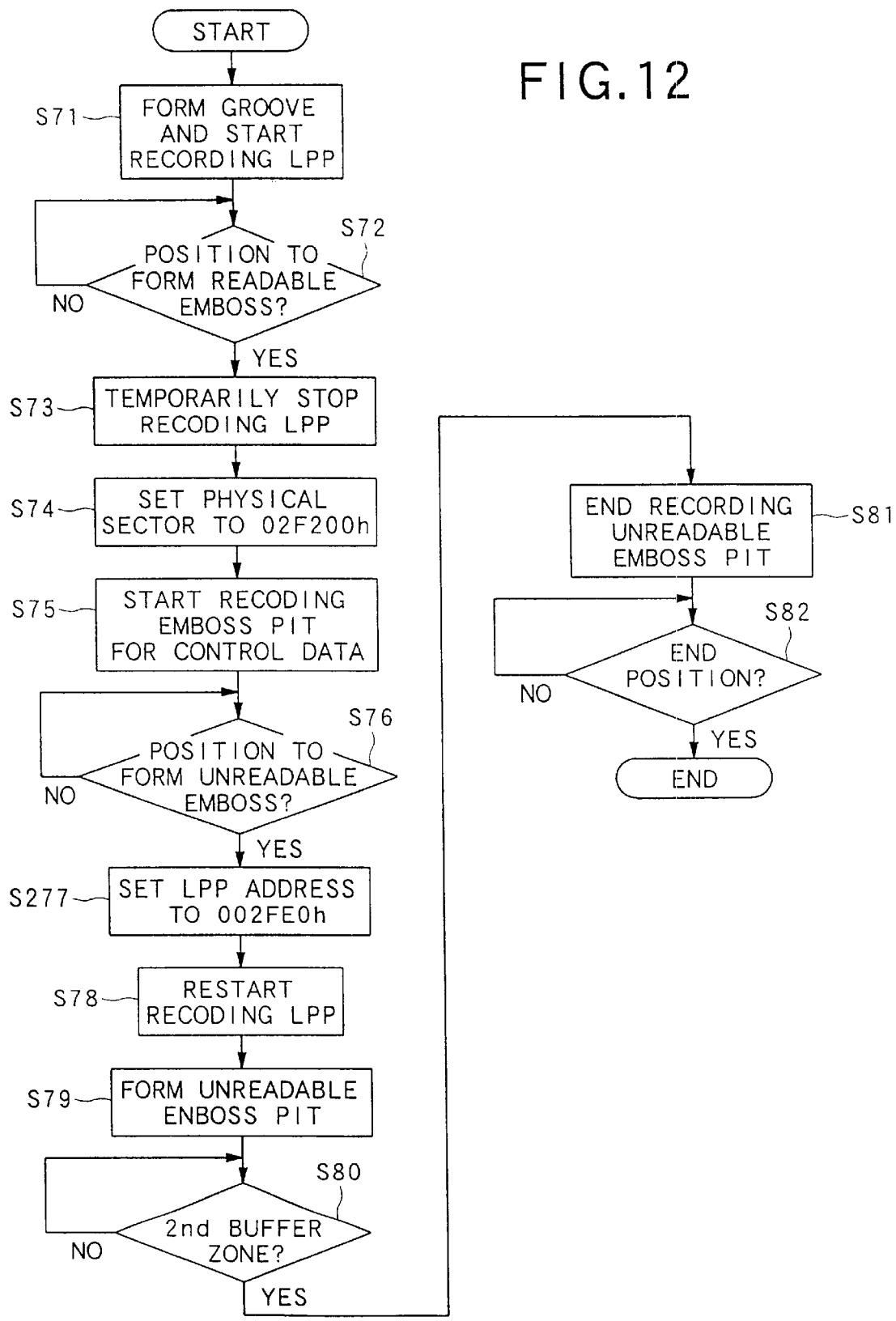
FIG. 12 is a flowchart showing an operation procedure of a disc production apparatus to producing a disc corresponding to FIG. 11.
Figure 13:
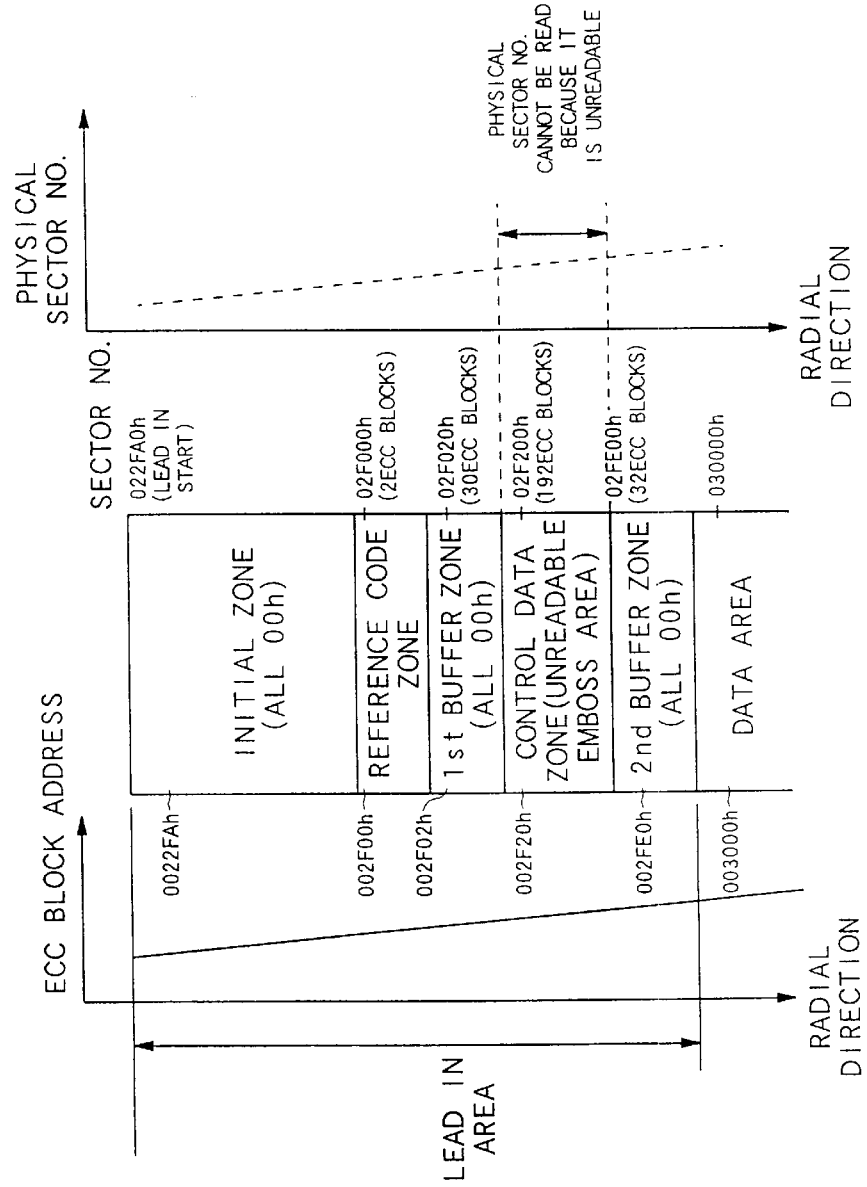
FIG. 13 is a diagram showing a detailed structure of a lead in area as well as an address allocation in a DVD-RW format in a related art.

FIG. 11 is a diagram showing another embodiment of the lead in area, and FIG. 12 is a flowchart showing the operation of the disc production apparatus to realize this another embodiment. In FIG. 12, the same steps as those in FIG. 9 carry the same step numbers, and the explanations thereof are omitted.

The difference between this embodiment shown in FIGS. 11 and 12 and the embodiment shown in FIGS. 9 and 10 is that, while the control data zone consisting of 192 ECC blocks is formed as the readable emboss area and the front half 16 ECC blocks of the following buffer zone consisting of 32 ECC blocks is formed as the unreadable emboss area in the embodiment shown in FIGS. 9 and 10, the front 176 ECC blocks of the control data zone originally consisting of 192 ECC blocks is formed as the readable emboss area and the rear 16 ECC blocks are allocated as the unreadable emboss area in the embodiment shown in FIGS. 11 and 12. Therefore, in the control data zone, the control data consisting of 16 sectors is written repeatedly by 176 times, and the buffer zone following the unreadable emboss area is 32 ECC blocks as they are.

In case that this unreadable emboss zone is 16 ECC blocks, it is required to forcedly set the ECC block address "002FD0"h (at the step S277) when the position to form the unreadable emboss is detected (at the step S76).

In addition, according to the present method shown in FIGS. 11 and 12, in the same manner as the embodiment shown in FIGS. 9 and 10 and different from the embodiment shown in FIG. 3, it is not necessary to perform a complicated address operation in order to obtain the compatibility with the conventional DVD-RW version. Therefore, as long as the writing and/or reading operation in the data area is not interrupted, it is effective since the processing load for the address control is reduced.

As described above, according to the present embodiment, the control data zone (consisting of the 192 ECC blocks) is formed as the readable emboss, and the unreadable emboss area of the 64 ECC blocks is allocated between this control data zone and the buffer zone, which follows the control data zone and consists of the 32 ECC blocks. Alternatively, the control data zone (consisting of the 192 ECC blocks) is formed as the readable emboss, and the front half 16 ECC blocks of the buffer zone, which follows the control data zone and consists of the 32 ECC blocks is allocated as the unreadable emboss area. Further alternatively, the front 176 ECC blocks of the control data zone originally consisting of the 192 ECC blocks are formed as the readable emboss, and the rear 16 ECC blocks are allocated as the unreadable emboss area. Therefore, the data recording operation with respect to the area immediately after the unreadable emboss area can be performed. Also, the land pre-pit corresponding to the readable emboss area is not recorded. Further, the address of the guide track corresponding to the unreadable area is determined on the basis of the lead address information of the guide signal corresponding to the data area, so as to make the physical sector number coincide with that of the conventional DVD-RW version.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosures of Japanese Patent Applications No. 2000-0078102 filed on Mar. 21, 2000 and NO. 2000-38609 filed on Feb. 16, 2000 including the specification, claims, drawings and summary is incorporated herein by reference in its entirety.

What is claimed is:

1. An optical disc comprising:
a lead-in area including at least an initial zone and a control data zone; and
a recordable area in which record information is to be recorded,
wherein the control data zone comprises a first emboss area and a second emboss area,
wherein the first emboss area is larger than the second emboss area.

2. The optical disc according to claim 1, wherein the first emboss area has M1 pieces of ECC blocks and the second emboss area has M2 pieces of ECC blocks,
wherein the M2 is smaller number then the M1.

3. The optical disc according to claim 2, wherein the number of M1 is equal to 176 and the number of M2 is equal to 16.

4. The optical disc according to claim 1, wherein the first emboss area is a readable emboss area and the second emboss area is an unreadable emboss area.

5. The optical disc according to claim 1, wherein the lead-in area further includes a reference code zone, a first buffer one and a second buffer zone.

6. A method of producing an optical disc comprising a lead-in area including at least an initial zone and a control data zone; and a recordable area in which record information is to be recorded wherein the control data zone comprises a first emboss area and a second emboss area, the method comprising:
positioning to a start position of the control data zone,
recording the first emboss area; and
recording the second emboss area,
wherein the first emboss area is larger than the second emboss area.

7. The method according to claim 6, wherein the first emboss area has M1 pieces of ECC blocks and the second emboss area has M2 pieces of ECC blocks,
wherein the M2 is a smaller number then the M1.

8. The method according to claim 7, wherein the number of M1 is equal to 176 and the number of M2 is equal to 16.

9. The method according to claim 6, wherein the first emboss area is a readable emboss area and the second emboss area is an unreadable emboss area.

10. The method according to claim 6, wherein the lead-in area further includes a reference code zone, a first buffer zone and a second buffer zone.

11. An apparatus of producing an optical disc comprising a lead-in area including at least an initial zone and a control data zone; and a recordable area in which record information is to be recorded wherein the control data zone comprises a first emboss area and a second emboss area, the apparatus comprising:
a position detector which positions to a start position of the control data zone;
a first recording device which records the first emboss area; and
a second recording device which records the second emboss area,
wherein the first emboss area is larger than the second emboss area.

12. The apparatus according to claim 11, wherein the first emboss area has M1 pieces of ECC blocks and the second emboss area has M2 pieces of ECC blocks,
wherein the M2 is a smaller number then the M1.

13. The apparatus according to claim 11, wherein the first emboss area is a readable emboss area and the second emboss area is an unreadable emboss area.

14. The apparatus according to claim 11, wherein the lead-in area further includes a reference code zone, a first buffer zone and a second buffer zone.

15. The apparatus according to claim 11, wherein the number of M1 is equal to 176 and the number of M2 is equal to 16.

* * * * *